United States Patent
Tae et al.

(10) Patent No.: US 11,048,133 B2
(45) Date of Patent: Jun. 29, 2021

(54) LIQUID CRYSTAL DISPLAY PANEL AND LIQUID CRYSTAL DISPLAY DEVICE INCLUDING THE SAME

(71) Applicant: Samsung Display Co., Ltd., Yongin-Si (KR)

(72) Inventors: Heung-sik Tae, Bucheon-si (KR); Yoonseop Shim, Asan-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/512,330

(22) Filed: Jul. 15, 2019

(65) Prior Publication Data
US 2020/0081282 A1    Mar. 12, 2020

(30) Foreign Application Priority Data
Sep. 12, 2018 (KR) .................. 10-2018-0109052

(51) Int. Cl.
*G02F 1/1368* (2006.01)
*G02F 1/1335* (2006.01)
*G02F 1/1362* (2006.01)

(52) U.S. Cl.
CPC ...... *G02F 1/1368* (2013.01); *G02F 1/133514* (2013.01); *G02F 1/136213* (2013.01); *G02F 2201/52* (2013.01)

(58) Field of Classification Search
None
See application file for complete search history.

(56) References Cited

U.S. PATENT DOCUMENTS

| 9,802,212 B2 | 10/2017 | Kitamura et al. |
| 10,032,426 B2 | 7/2018 | Kim et al. |
| 2010/0207858 A1* | 8/2010 | Chen .................. G02F 1/133514 345/88 |
| 2017/0261819 A1* | 9/2017 | Kim .................... G02F 1/13624 |

FOREIGN PATENT DOCUMENTS

| KR | 10-0859465 B1 | 9/2008 |
| KR | 10-2014-0051593 A | 5/2014 |
| KR | 10-2015-0133849 A | 11/2015 |
| KR | 10-2017-0035387 A | 3/2017 |

* cited by examiner

Primary Examiner — James A Dudek
(74) Attorney, Agent, or Firm — Innovation Counsel LLP

(57) ABSTRACT

Provided is a liquid crystal display device. The liquid crystal display device includes a display panel including a liquid crystal layer, wherein a first pixel region, a second pixel region, and a third pixel region are defined in the display panel and a backlight unit configured to provide light to the display panel. A first color light emitted from the first pixel region has a red color, a second color light emitted from the second pixel region has a green color, and a third color light emitted from the third pixel region has a blue color. A first ratio at which the light passes through the first pixel region and a second ratio at which the light passes through the second pixel region is greater than a third ratio at which the light passes through the third pixel region.

19 Claims, 8 Drawing Sheets

LIQUID CRYSTAL DISPLAY PANEL AND LIQUID CRYSTAL DISPLAY DEVICE INCLUDING THE SAME

CROSS-REFERENCE TO RELATED APPLICATIONS

This patent application claims priority to Korean Patent Application No. 10-2018-0109052, filed on Sep. 12, 2018, and all the benefits accruing therefrom under 35 U.S.C. § 119, the content of which in its entirety is herein incorporated by reference.

BACKGROUND

The present disclosure herein relates to a liquid crystal display panel having excellent viewing angle characteristics and light transmittance, and a display device including the same.

A liquid crystal display device includes a liquid crystal display panel with two substrates facing each other, and a liquid crystal layer disposed between the substrates. The liquid crystal display device applies a voltage to the electric field generating electrode to apply an electric field to the liquid crystal layer. Accordingly, the alignment direction of the liquid crystal molecules in the liquid crystal layer is determined, and the image is displayed by controlling the polarization of the incident light.

Among liquid crystal display devices, there is a vertically aligned mode liquid crystal display device in which the long axis of the liquid crystal molecules is arranged perpendicular to the two substrates in the absence of an electric field, such that a contrast ratio is large and a wide reference viewing angle is easily implemented.

In order to improve the viewing angle characteristics of the liquid crystal display, techniques for dividing the pixel region into a plurality of domains and controlling them have been developed. Examples of such techniques include a Charge Share (CS) method and a Resistivity Division (RD) method.

In order to improve the viewing angle characteristics using a plurality of domains as described above, a large number of transistors and a large number of capacitors are required, such that the transmittance of the liquid crystal display panel is reduced.

SUMMARY

The present disclosure is to provide a liquid crystal display panel having excellent visibility and viewing angle characteristics and a high light transmittance, and a liquid crystal display device including the same.

An embodiment of the inventive concept provides a liquid crystal display device including: a display panel including a liquid crystal layer, wherein a first pixel region, a second pixel region, and a third pixel region are defined in the display panel; and a backlight unit configured to provide light to the display panel, wherein each of a wavelength of a first color light generated by transmitting the light through the first pixel region and a wavelength of a second color light generated by transmitting the light through the second pixel region is longer than a wavelength of a third color light generated by transmitting the light through the third pixel region, wherein a first ratio at which the light passes through the first pixel region and a second ratio at which the light passes through the second pixel region is greater than a third ratio at which the light passes through the third pixel region.

In an embodiment, the first color light may have a red color, the second color light may have a green color, and the third color light may have a blue color.

In an embodiment, the third pixel region may include a high gradation region and a low gradation region, wherein a gradation of light emitted from the high gradation region of the third color light may be higher than a gradation of light emitted from the low gradation region of the third color light.

In an embodiment, the display panel may include a plurality of transistors, wherein the number of transistors disposed in the first pixel region among the plurality of transistors may be equal to the number of transistors disposed in the second pixel region among the plurality of transistors, wherein the number of transistors disposed in the third pixel region among the plurality of transistors may be greater than the number of transistors disposed in the first pixel region among the plurality of transistors.

In an embodiment, the number of the transistors disposed in the first pixel region may be one, and the number of the transistors disposed in the third pixel region may be three.

In an embodiment, the display panel may further include: a first color filter overlapping the first pixel region and configured to transmit light having a wavelength of between 640 nm and 730 nm in the light; a second color filter overlapping the second pixel region and configured to transmit light having a wavelength of between 492 nm and 580 nm in the light; and a third color filter overlapping the third pixel region and configured to transmit light having a wavelength of between 420 nm and 490 nm in the light.

In an embodiment, the display panel may further include: a plurality of pixel electrodes; and a common electrode overlapping the plurality of pixel electrodes, wherein the liquid crystal layer may be disposed between the plurality of pixel electrodes and the common electrode.

In an embodiment, the number of pixel electrodes disposed in the first pixel region among the plurality of pixel electrodes may be equal to the number of pixel electrodes disposed in the second pixel region among the plurality of pixel electrodes, wherein the number of pixel electrodes disposed in the third pixel region among the plurality of pixel electrodes may be greater than the number of pixel electrodes disposed in the first pixel region.

In an embodiment, the number of the pixel electrodes disposed in the first pixel region may be one and the number of the pixel electrodes disposed in the third pixel region may be two.

In an embodiment of the inventive concept, a liquid crystal display panel includes: a first substrate where a first pixel region, a second pixel region, and a third pixel region are defined; a second substrate disposed opposite the first substrate; and a liquid crystal layer disposed between the first substrate and the second substrate, wherein a first color light emitted from the first pixel region has a red color, a second color light emitted from the second pixel region has a green color, and a third color light emitted from the third pixel region has a blue color, wherein a light transmittance of the third pixel region is less than a light transmittance of the first pixel region and a light transmittance of the second pixel region.

In an embodiment, the third pixel region may include a high gradation region and a low gradation region, wherein a gradation of light emitted from the high gradation region in the third color light may be higher than a gradation of light emitted from the low gradation region in the third color light.

In an embodiment, the liquid crystal display panel may further include a plurality of transistors disposed on the first substrate, wherein the number of transistors disposed in the first pixel region among the plurality of transistors may be equal to the number of transistors disposed in the second pixel region among the plurality of transistors, wherein the number of transistors disposed in the third pixel region among the plurality of transistors may be greater than the number of transistors disposed in the first pixel region among the plurality of transistors.

In an embodiment, the number of the transistors disposed in the first pixel region may be one, and the number of the transistors disposed in the third pixel region may be three.

In an embodiment, the liquid crystal display panel may further include a plurality of pixel electrodes, each of which is electrically connected to the plurality of transistors; and a common electrode overlapping the plurality of pixel electrodes, wherein the liquid crystal layer may be disposed between the plurality of pixel electrodes and the common electrode.

In an embodiment, the number of pixel electrodes disposed in the first pixel region among the plurality of pixel electrodes may be equal to the number of pixel electrodes disposed in the second pixel region among the plurality of pixel electrodes, wherein the number of pixel electrodes disposed in the third pixel region among the plurality of pixel electrodes may be greater than the number of pixel electrodes disposed in the first pixel region.

In an embodiment, the number of the pixel electrodes disposed in the first pixel region may be one and the number of the pixel electrodes disposed in the third pixel region may be two.

In an embodiment of the inventive concept, a liquid crystal display device includes: a display panel including a liquid crystal layer, wherein a first pixel region, a second pixel region, and a third pixel region are defined in the display panel; and a backlight unit configured to provide light to the display panel, wherein each of the first pixel region and the second pixel region includes only one transistor, and the third pixel region includes three transistors, wherein each of a wavelength of a first color light generated by transmitting the light through the first pixel region and a wavelength of a second color light generated by transmitting the light through the second pixel region is longer than a wavelength of a third color light generated by transmitting the light through the third pixel region.

In an embodiment, the first color light may have a red color, the second color light may have a green color, and the third color light may have a blue color.

In an embodiment, the third pixel region may include a high gradation region and a low gradation region, wherein a gradation of light emitted from the high gradation region of the third color light may be higher than a gradation of light emitted from the low gradation region of the third color light.

In an embodiment, a first ratio at which the light passes through the first pixel region and a second ratio at which the light passes through the second pixel region may be greater than a third ratio at which the light passes through the third pixel region.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
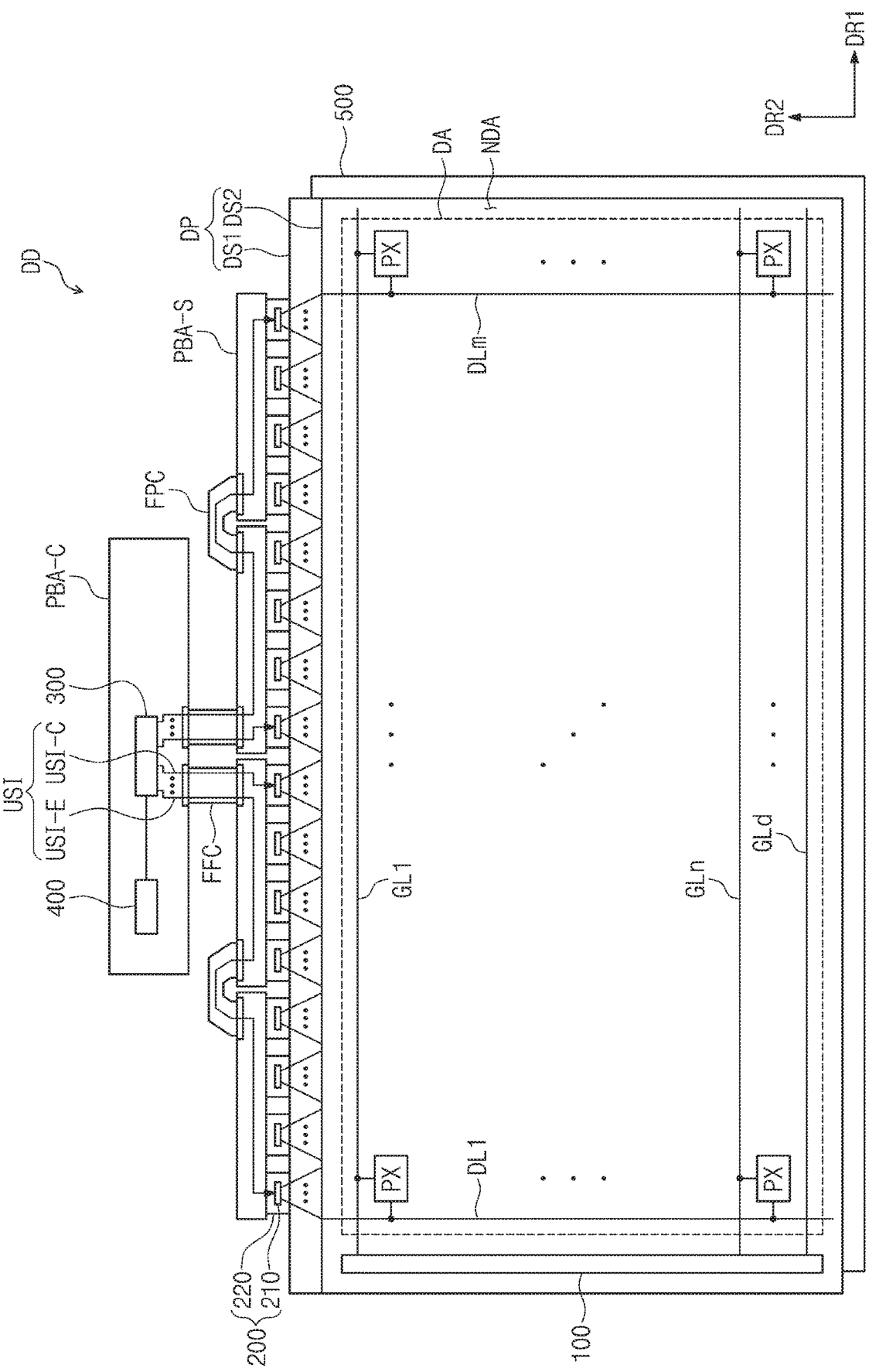
FIG. 1 is a plan view of a display device according to an embodiment of the inventive concept.

Hereinafter, another embodiment of the inventive concept will be described with reference to the drawings.

Additionally, in the drawings, the thicknesses, proportions, and dimensions of components are exaggerated for effective description. "And/or" includes all of one or more combinations defined by related components.

In various embodiments of the inventive concept, the term "include," "comprise," "including," or "comprising," specifies a property, a region, a fixed number, a step, a process, an element and/or a component but does not exclude other properties, regions, fixed numbers, steps, processes, elements and/or components.

Figure 2:
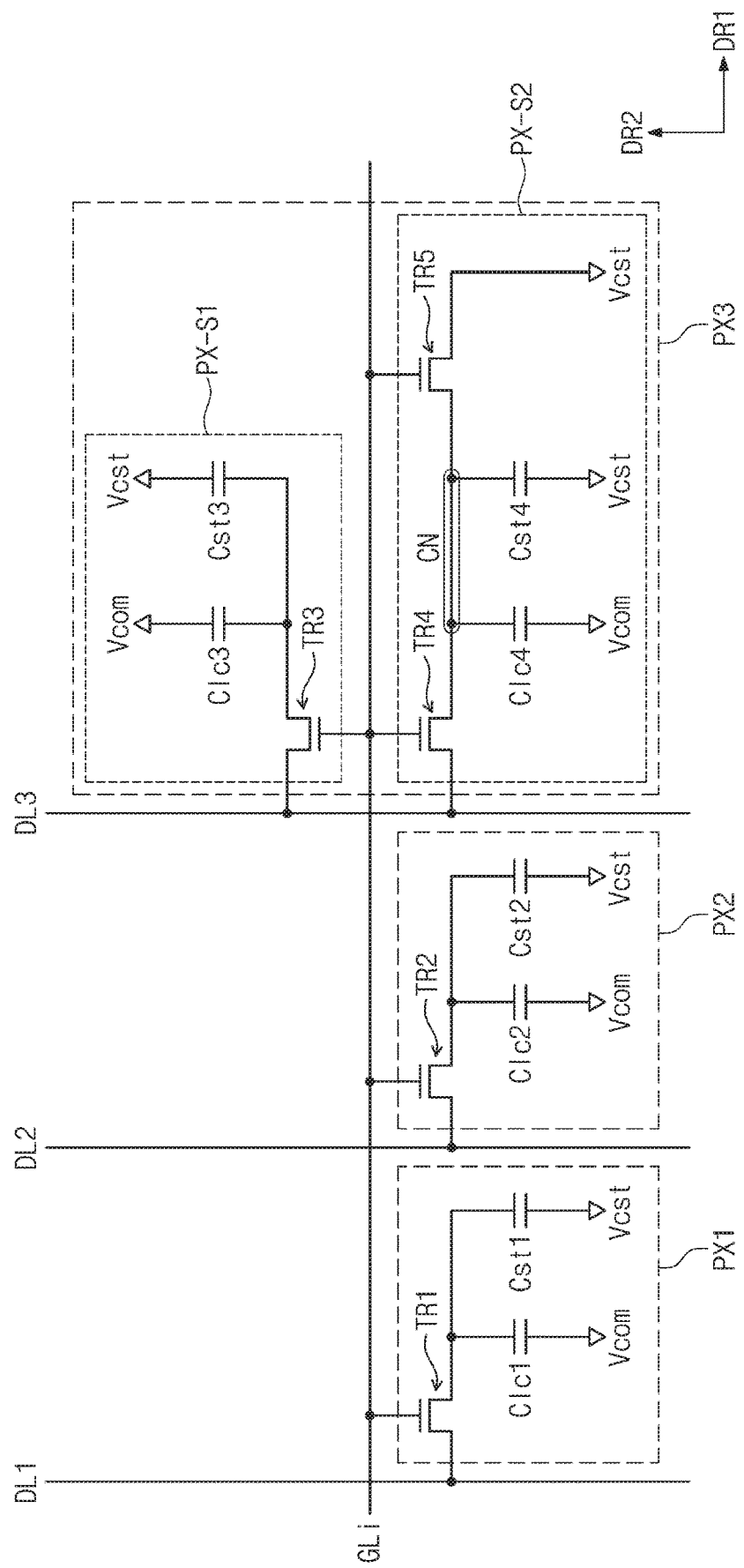
FIG. 2 is an equivalent circuit diagram of pixels according to an embodiment of the inventive concept.
Figure 3A:
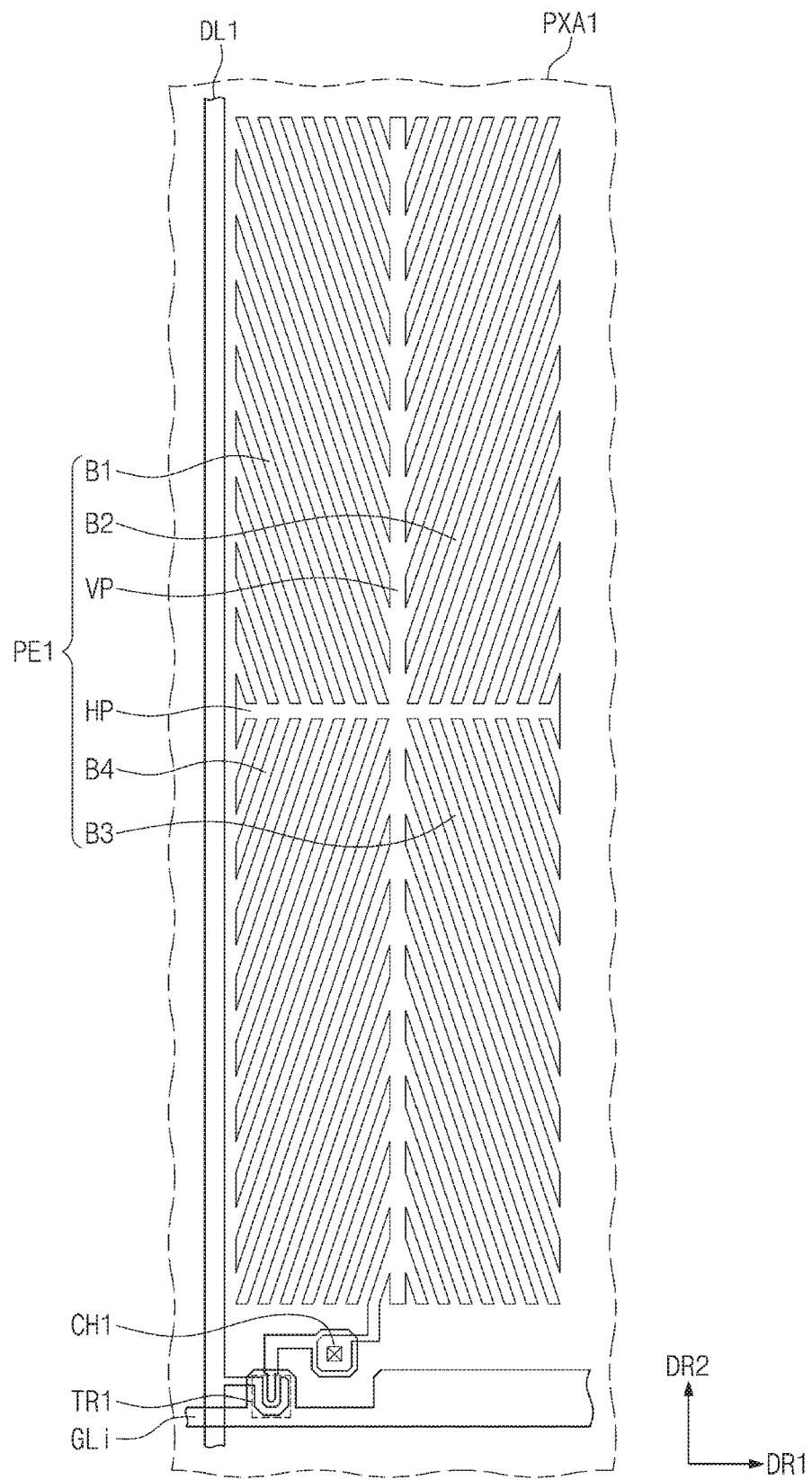
FIG. 3A shows an exemplary layout of a first pixel region corresponding to a first pixel shown in FIG. 2.
Figure 3B:
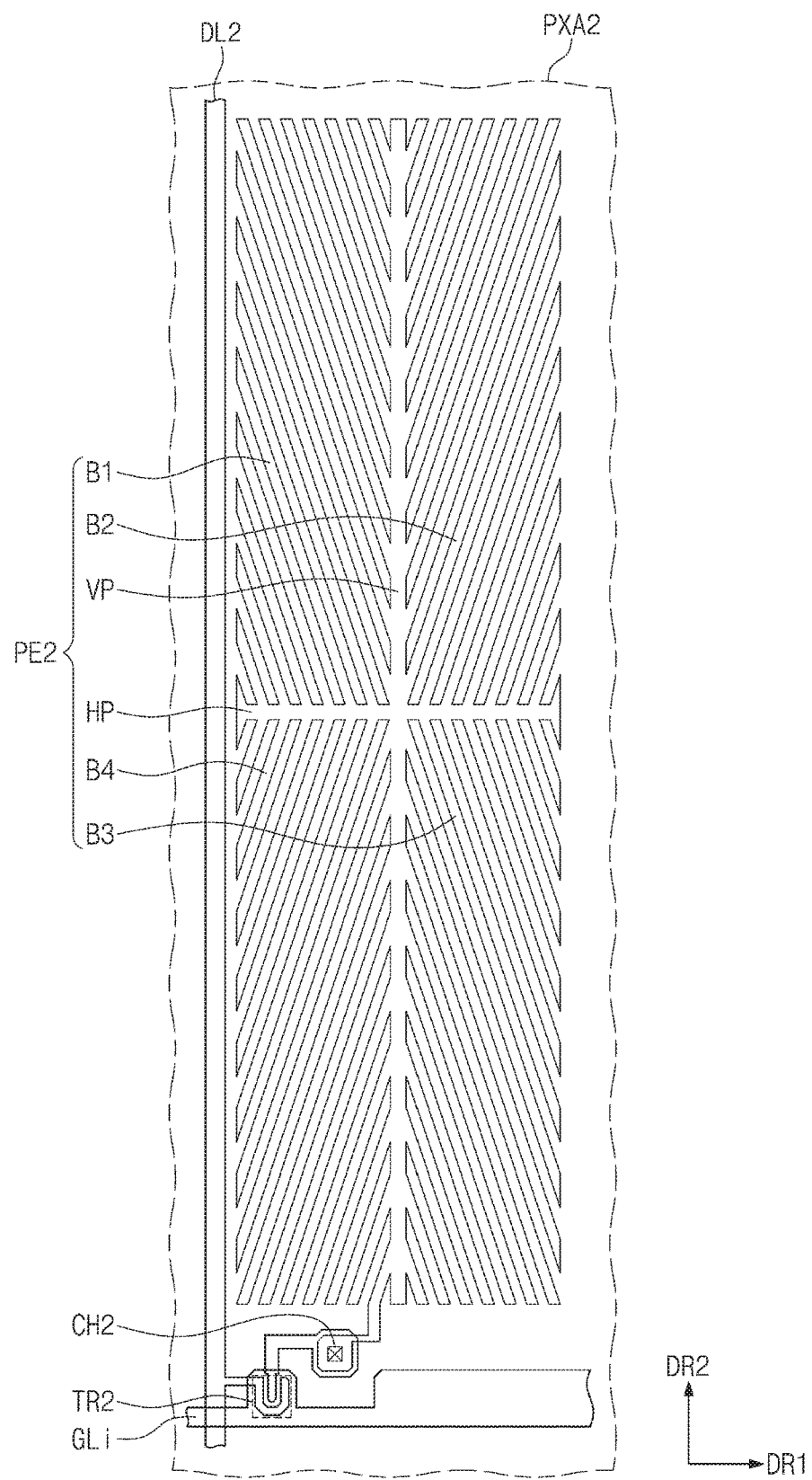
FIG. 3B shows an exemplary layout of a second pixel region corresponding to a second pixel shown in FIG. 2.
Figure 3C:
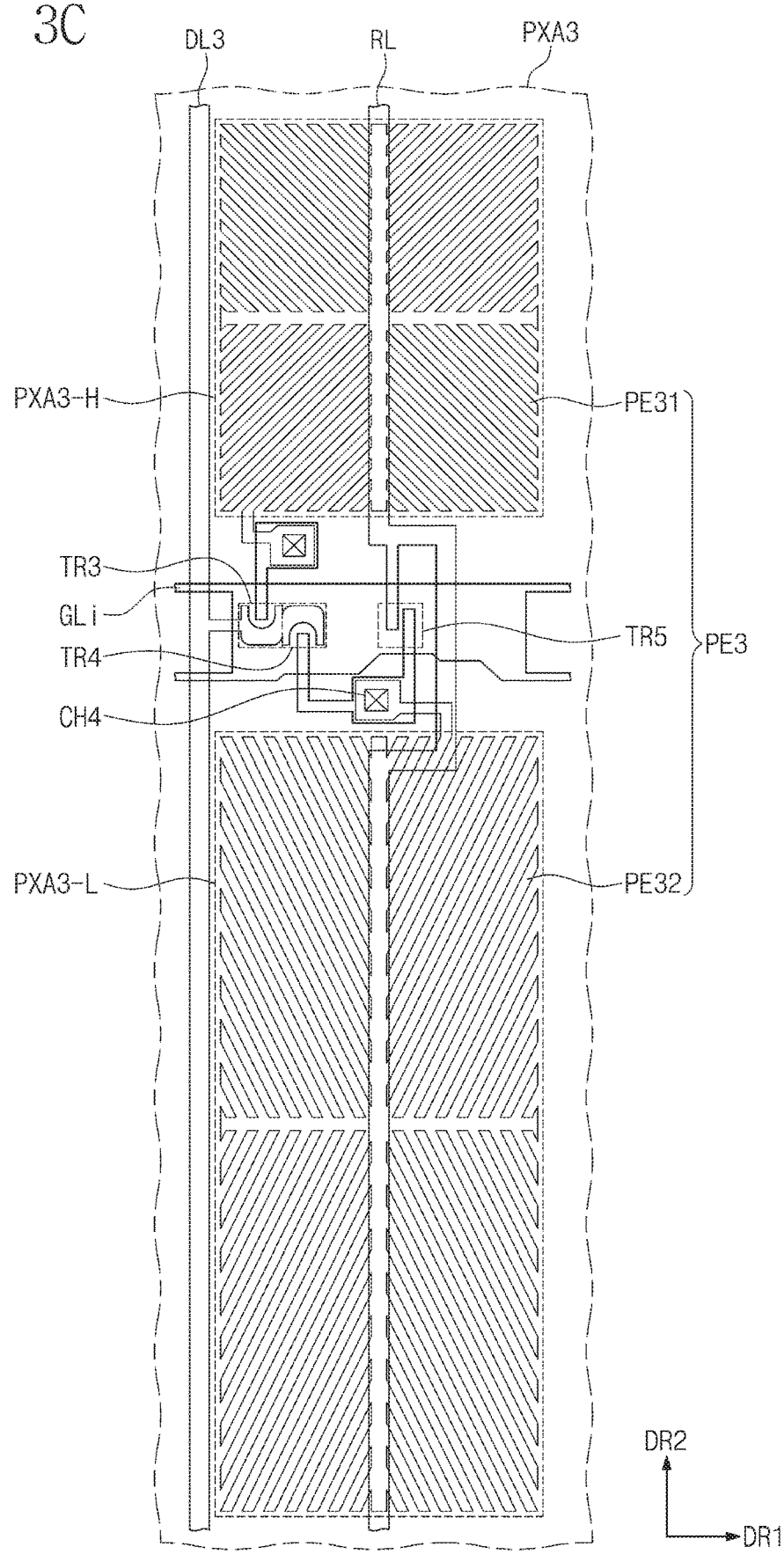
FIG. 3C shows an exemplary layout of a third pixel region corresponding to a third pixel shown in FIG. 2.
Figure 4:
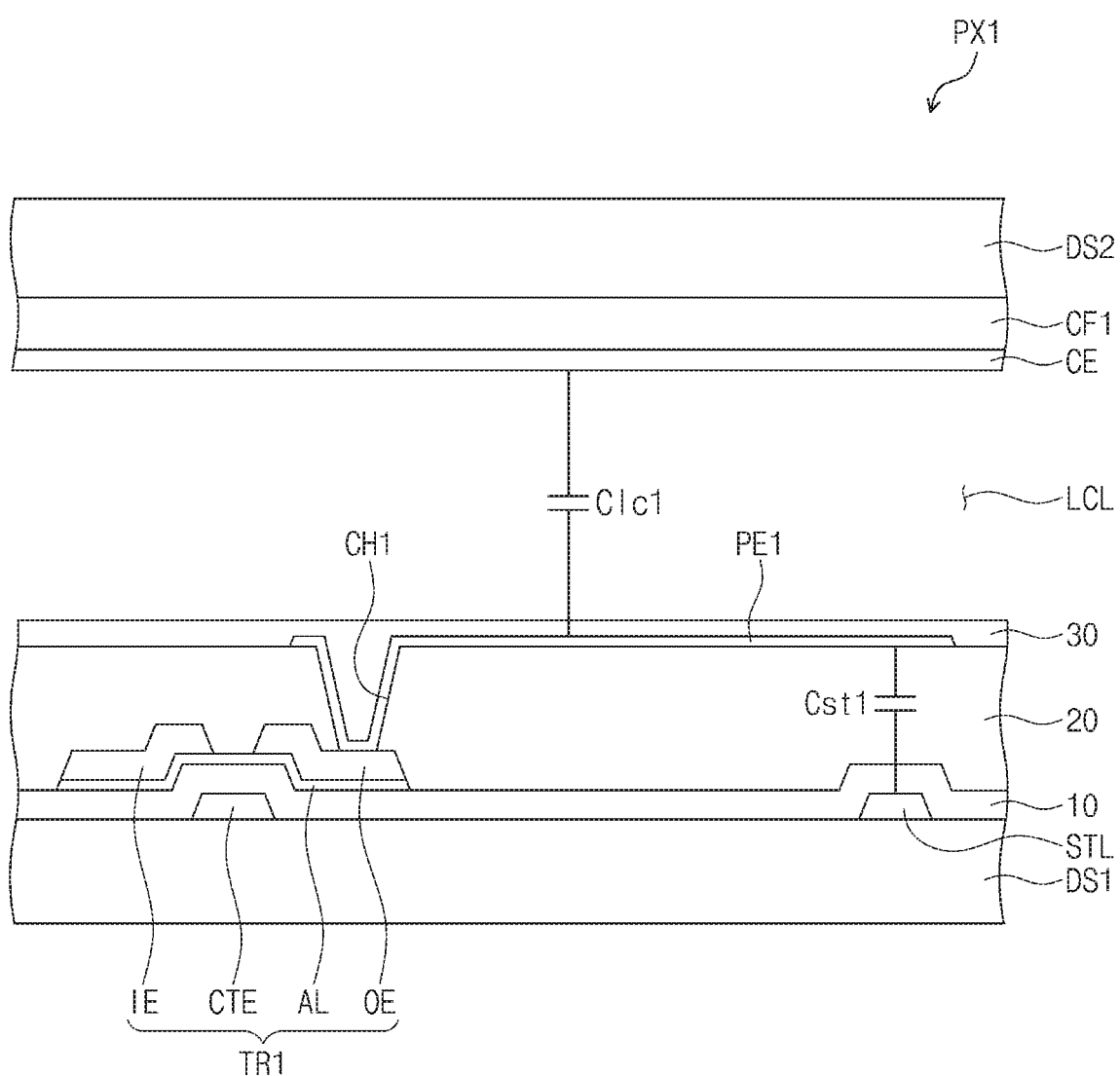
FIG. 4 exemplarily shows a cross-sectional view corresponding to a part of the components of a first pixel shown in FIG. 2.

FIG. 1 is a plan view of a display device DD according to an embodiment of the inventive concept. FIG. 2 is an equivalent circuit diagram of pixels PX1 to PX3 according to an embodiment of the inventive concept. FIG. 3A shows an example layout of a first pixel region PXA1 corresponding to a first pixel PX1 shown in FIG. 2. FIG. 3B shows an example layout of a second pixel region PXA2 corresponding to a second pixel PX2 shown in FIG. 2. FIG. 3C shows an example layout of a third pixel region PXA3 corresponding to a third pixel PX3 shown in FIG. 2. FIG. 4 shows a cross-sectional view corresponding to a part of the components of a first pixel PX1 shown in FIG. 2.

As shown in FIG. 1, a display device according to an embodiment of the inventive concept includes a display panel DP, a gate driving circuit 100, a data driving circuit 200, a signal control unit 300, a power management circuit 400, and a backlight unit 500.

In this embodiment, the display panel DP is described as a liquid crystal display panel. On the other hand, a liquid crystal display device including a liquid crystal display panel may further include a polarizer (not shown).

The display panel DP includes a first substrate DS1, a second substrate DS2 spaced apart from the first substrate DS1, and a liquid crystal layer LCL disposed between the first substrate DS1 and the second substrate DS2. The second substrate DS2 faces the first substrate DS1. On the plane defined by the first direction DR1 and the second direction DR2, the display panel DP includes a display area DA in which a plurality of pixels PX are arranged and a non-display area NDA surrounding the display area DA.

The display panel DP includes a plurality of gate lines GL1 to GLn disposed on the first substrate DS1 and a plurality of data lines DL1 to DLm intersecting the plurality of gate lines GL1 to GLn. The plurality of gate lines GL1 to GLn are connected to the gate driving circuit 100. The plurality of data lines DL1 to DLm are connected to the data driving circuit 200. Only some of the plurality of gate lines GL1 to GLn and only some of the plurality of data lines DL1 to DLm are illustrated in FIG. 1. Additionally, the display panel DP may further include a dummy gate line GLd disposed in the non display area NDA of the first substrate DS1.

Only some of the plurality of pixels PX are illustrated in FIG. 1. The plurality of pixels PX are respectively connected to corresponding gate lines among the plurality of gate lines GL1 to GLn and corresponding data lines among the plurality of data lines DL1 to DLm. However, the dummy gate line GLd is not connected to the plurality of pixels PX.

The plurality of pixels PX may be divided into a plurality of groups according to a color displayed. The plurality of pixels PX may display one of a plurality of primary colors. The primary colors may include red, green, blue, and white. However, the embodiment of the inventive concept is not limited thereto and the primary colors may further include various colors such as yellow, cyan, magenta, and so on.

The gate driving circuit 100 and the data driving circuit 200 receive a control signal from a signal control unit 300 (for example, a timing controller). The signal control unit 300 may be mounted on the first circuit board PBA-C and may receive power from the power management circuit 400. The first circuit board PBA-C may be a printed board assembly (PBA). The power management circuit 400 may be a Power Management IC (PMIC).

The signal control unit 300 receives image data and control signals from an external graphic control unit (not shown). The control signals may include vertical sync signals that are signals for distinguishing frame sections, horizontal sync signals that are signals for distinguishing horizontal sections, that is, row distinction signals, and data enable signals that are in high level only during a section where data is outputted to display a data incoming area, and clock signals.

The gate driving circuit 100 generates gate signals based on a control signal (hereinafter referred to as a gate control signal) received from the signal control unit 300 and outputs the generated gate signals to the gate lines GL1 to GLn.

FIG. 1 shows one gate driving circuit 100 connected to the left ends of the plurality of gate lines GL1 to GLn. In an embodiment of the inventive concept, the display device may include two gate driving circuits. One of the two gate driving circuits may be connected to the left ends of the plurality of gate lines GL1 to GLn and the other one may be connected to the right ends of the plurality of gate lines GL1 to GLn. Additionally, one of the two gate driving circuits may be connected to odd gate lines and the other one may be connected to even gate lines.

The data driving circuit 200 generates gradation voltages according to image data provided from the signal control unit 300 on the basis of a control signal (hereinafter referred to as a data control signal) received from the signal control unit 300. The data driving circuit 200 outputs the gradation voltages to the plurality of data lines DL1 to DLm as data voltages.

In this specification, signals transmitted from an external graphic control unit and transmitted to the signal control unit 300, the data driving circuit 200, and the pixel PX may be collectively referred to as a data signal. The form of the data signal from the external graphic control unit to the pixel (PX) may be changed or processed, and the data signal is a signal including data for displaying an image in the display area DA.

The data driving circuit 200 includes a driving chip 210 and a flexible circuit board 220 mounting the driving chip 210. Each of the driving chip 210 and the flexible circuit board 220 may be provided in plurality. The flexible circuit board 220 may electrically connect the second circuit board PBA-S and the first substrate DS1.

The two adjacent second circuit boards PBA-S may be connected to each other by another flexible circuit board FPC.

The second circuit board PBA-S may be connected to the first circuit board PBA-C by a flexible flat cable FFC.

The plurality of driving chips 210 provide data signals corresponding to corresponding data lines among the plurality of data lines DL1 to DLm.

The signal control unit 300 and the driving chips 210 may be connected by interfaces USI. The interfaces USI include a center interface USI-C for connecting the signal control unit 300 to a near driving chip 210 and a side interface USI-S for connecting the signal control unit 300 to a far driving chip 210.

FIG. 1 shows a Tape Carrier Package (TCP) type data driving circuit 200 as an example. According to an embodiment of the inventive concept, the data driving circuit 210 may be disposed in the non-display area NDA of the first substrate DS1 through a Chip on Glass (COG) method.

On a plane, a backlight unit 500 may be disposed below the display panel DP. The backlight unit 500 may include a plurality of light sources (not shown). The backlight unit 500 may provide light to the display panel DP and the light emitted from the backlight unit 500 may pass through the display panel DP and be visible to the users of the display device DD.

FIG. 2 shows an equivalent circuit diagram corresponding to the pixels PX1, PX2, and PX3 connected to the first to third data lines DL1 to DL3 and the i-th gate line GLi among the pixels PX in FIG. 1.

Referring to FIG. 2, the first pixel PX1 includes a first transistor TR1, a first liquid crystal capacitor Clc1, and a first storage capacitor Cst1. In this specification, a transistor refers to a thin film transistor. According to an embodiment of the inventive concept, the first storage capacitor Cst1 may be omitted.

The first transistor TR1 is electrically connected to the i-th gate line GLi and the first data line DL1. The first transistor TR1 outputs a pixel voltage corresponding to a data signal received from the first data line DL1 in response to a gate signal received from the i-th gate line GLi.

The first liquid crystal capacitor Clc1 is charged with a pixel voltage outputted from the first transistor TR1. An arrangement of liquid crystal directors included in a liquid crystal layer LCL (see FIG. 4) is changed according to a charge amount charged in the first liquid crystal capacitor Clc1. The light incident to a liquid crystal layer may be transmitted or blocked according to an arrangement of liquid crystal directors.

Light emitted in a region corresponding to the first pixel PX1 may have a red color. In an embodiment of the inventive concept, when light emitted from the backlight unit 500 passes through a region corresponding to the first pixel PX1, light having a red color may be generated. In an embodiment of the inventive concept, when light emitted from the backlight unit 500 passes through a region corresponding to the first pixel PX1, only light having a wavelength of 640 nm or more and 730 nm or less may be transmitted.

The first storage capacitor Cst1 is connected in parallel to the first liquid crystal capacitor Clc1. The first storage capacitor Cst1 maintains the arrangement of liquid crystal directors during a predetermined section.

The second pixel PX2 includes a second transistor TR2, a second liquid crystal capacitor Clc2, and a second storage capacitor Cst2. According to an embodiment of the inventive concept, the second storage capacitor Cst2 may be omitted.

The second transistor TR2 is electrically connected to the i-th gate line GLi and the second data line DL2. The second transistor TR2 outputs a pixel voltage corresponding to a data signal received from the second data line DL2 in response to a gate signal received from the i-th gate line GLi.

The second liquid crystal capacitor Clc2 is charged with a pixel voltage outputted from the second transistor TR2. An arrangement of liquid crystal directors included in a liquid crystal layer LCL (see FIG. 4) is changed according to a charge amount charged in the second liquid crystal capacitor Clc2. The light incident to a liquid crystal layer may be transmitted or blocked according to an arrangement of liquid crystal directors.

Light emitted in a region corresponding to the second pixel PX2 may have a green color. In an embodiment of the inventive concept, when light emitted from the backlight unit 500 passes through a region corresponding to the second pixel PX2, light having a green color may be generated. In an embodiment of the inventive concept, when light emitted from the backlight unit 500 passes through a region corresponding to the second pixel PX2, only light having a wavelength of 492 nm or more and 580 nm or less may be transmitted.

The second storage capacitor Cst2 is connected in parallel to the second liquid crystal capacitor Clc2. The second storage capacitor Cst2 maintains the arrangement of liquid crystal directors during a predetermined section.

The third pixel PX3 may include a first sub-pixel PX-S1 and a second sub-pixel PX-S2.

The first sub-pixel PX-S1 may include a third transistor TR3, a third liquid crystal capacitor Clc3, and a third storage capacitor Cst3. The second sub-pixel PX-S2 may include a fourth transistor TR4, a fifth transistor TR5, a fourth liquid crystal capacitor Clc4, and a fourth storage capacitor Cst4.

The control electrode of the third transistor TR3 is connected to the i-th gate line GLi, the input electrode of the third transistor TR3 is connected to the third data line DL3, and the output electrode of the third transistor TR3 is connected to the third liquid crystal capacitor Clc3 and the third storage capacitor Cst3.

The first electrode of the third liquid crystal capacitor Clc3 is connected to the output electrode of the third transistor TR3 and the second electrode of the third liquid crystal capacitor Clc3 receives the common voltage Vcom. The first electrode of the third storage capacitor Cst3 is connected to the output electrode of the third transistor TR3 and the second electrode of the third storage capacitor Cst3 receives the storage voltage Vcst.

The control electrode of the fourth transistor TR4 is connected to the i-th gate line GLi, the input electrode of the fourth transistor TR4 is connected to the third data line DL3, and the output electrode of the fourth transistor TR4 is connected to the fourth liquid crystal capacitor Clc4 and the fourth storage capacitor Cst4.

The control electrode of the fifth transistor TR5 is connected to the i-th gate line GLi, the input electrode of the fifth transistor TR5 receives the storage voltage Vcst, and the output electrode of the fifth transistor TR5 is connected to the output electrode of the fourth transistor TR4.

The first electrode of the fourth liquid crystal capacitor Clc4 is connected to the output electrode of the fourth transistor TR4 and the second electrode of the fourth liquid crystal capacitor Clc4 receives the common voltage Vcom. The first electrode of the fourth storage capacitor Cst4 is connected to the output electrode of the fourth transistor TR4 and the second electrode of the fourth storage capacitor Cst4 receives the storage voltage Vcst.

The common voltage Vcom and the storage voltage Vcst may have substantially the same voltage.

The third to fifth transistors TR3, TR4, and TR5 are turned on by the gate signal provided through the gate line GLi.

The data voltage of the third data line DL3 is supplied to the first sub-pixel PX-S1 through the turned-on third transistor TR3. The third liquid crystal capacitor Clc3 is charged with the pixel voltage (hereinafter referred to as the first pixel voltage) corresponding to the level difference between the provided data voltage and the common voltage Vcom. The arrangement of the liquid crystal director included in the liquid crystal layer LCL is changed according to the amount of charge charged in the third liquid crystal capacitor Clc3. The light incident to a liquid crystal layer may be transmitted or blocked according to an arrangement of liquid crystal directors. The third storage capacitor Cst3 is connected in parallel to the third liquid crystal capacitor Clc3 to maintain the arrangement of the liquid crystal director for a predetermined period.

The data voltage of the third data line DL3 is supplied to the second sub-pixel PX-S2 through the turned-on fourth transistor TR4. In addition, the storage voltage Vcst is supplied to the second sub-pixel PX-S2 through the turned-on fifth transistor TR5.

The voltage (hereinafter referred to as a distribution voltage) at the contact node CN to which the fourth transistor TR4 and the fifth transistor TR5 are connected has a value that is distributed according to the ratio of the resistance value when each of the fourth and fifth transistors TR4 and TR5 is turned-on. That is, the distribution voltage has a value between the data voltage supplied through the turned-on fourth transistor TR4 and the storage voltage Vcst provided through the turned-on fifth transistor TR5.

Thus, the fourth liquid crystal capacitor Clc4 is charged with the pixel voltage (hereinafter referred to as the second pixel voltage) corresponding to the level difference between the distribution voltage and the common voltage Vcom. The arrangement of the liquid crystal director included in the liquid crystal layer LCL is changed according to the amount of charge charged in the second liquid crystal capacitor Clc2. The light incident to a liquid crystal layer may be transmitted or blocked according to an arrangement of liquid crystal directors. The fourth storage capacitor Cst4 is connected in parallel to the fourth liquid crystal capacitor Clc4 to maintain the arrangement of the liquid crystal director for a predetermined period.

Since the first pixel voltage charged in the third liquid crystal capacitor Clc3 and the second pixel voltage charged in the fourth liquid crystal capacitor Clc4 are different from each other, the gradation displayed in the first sub-pixel PX-S1 is different from the gradation displayed in the second sub-pixel PX-S2. Thus, visibility of the third pixel PX3 may be improved by displaying images of different gradations in the first and second sub-pixels PX-S1 and PX-S2.

Light emitted in a region corresponding to the third pixel PX3 may have a blue color. In an embodiment of the inventive concept, when light emitted from the backlight unit 500 passes through a region corresponding to the third pixel PX3, light having a blue color may be generated. In an embodiment of the inventive concept, when light emitted from the backlight unit 500 passes through a region corresponding to the third pixel PX3, only light having a wavelength of 420 nm or more and 490 nm or less may be transmitted.

The equivalent circuit diagram of the third pixel PX3 shown in FIG. 2 is illustratively shown, but not limited thereto. In other embodiments of the inventive concept, the third and fourth storage capacitors Cst3 and Cst4 may be omitted.

Referring to FIGS. 3A to 3C, the display area DA may include a first pixel region PXA1, a second pixel region PXA2, and a third pixel region PXA3.

Referring to FIG. 3A, a first pixel region PE1, a first transistor TR1, a portion of a first data line DL1, and a portion of a gate line GLi may be disposed in a first pixel region PXA1.

The first pixel electrode PE1 includes a vertical electrode VP, a horizontal electrode HP, first branch electrodes B1, second branch electrodes B2, third branch electrodes B3, and fourth branch electrodes B4. The vertical electrode VP, the horizontal electrode HP, the first branch electrodes B1, the second branch electrodes B2, the third branch electrodes B3, and the fourth branch electrodes B4 are connected so that one first pixel electrode PE1 is formed.

The vertical electrode VP extends along the second direction DR2 and the horizontal electrode HP extends along the first direction DR1. Each of the first branch electrodes B1, the second branch electrodes B2, the third branch electrodes B3, and the fourth branch electrodes B4 extends from the vertical electrode VP or the horizontal electrode HP. The configuration and shape of the first pixel electrode PE1 shown in FIG. 3A are examples and the configuration and shape of the first pixel electrode PE1 may be changed.

Referring to FIG. 3B, the second pixel electrode PE2, the second transistor TR2, a portion of the second data line DL2, and a portion of the gate line GLi may be disposed in the second pixel region PXA2.

The description of the second pixel region PXA2 is substantially the same as that of the first pixel region PXA1, and thus is omitted.

Referring to FIG. 3C, the third pixel electrode PE3, the third transistor TR3, the fourth transistor TR4, the fifth transistor TR5, a portion of the third data line DL3, and a portion of the gate line GLi may be disposed in the third pixel region PXA3.

The third pixel electrode PE3 may include a first sub-pixel electrode PE31 and a second sub-pixel electrode PE32. In an embodiment of the inventive concept, the area of the second sub-pixel electrode PE32 may be larger than the area of the first sub-pixel electrode PE31.

The structure and shape of each of the first sub-pixel electrode PE31 and the second sub-pixel electrode PE32 may be substantially similar to the structure and shape of the first pixel electrode PE1 described with reference to FIG. 3A.

The third pixel region PXA3 may include a high gradation region PXA3-H and a low gradation region PXA3-L. The high gradation region PXA3-H is defined as the region where the first sub-pixel electrode PE31 is disposed and the low gradation region PXA3-L is defined as the region where the second sub-pixel electrode PE32 is disposed. The high gradation region PXA3-H corresponds to the first sub-pixel PX-S1 in FIG. 2 and the low gradation region PXA3-L corresponds to the second sub-pixel PX-S2 in FIG. 2.

In this specification, the first sub-pixel electrode PE31 and the second sub-pixel electrode PE32 may be understood as different sub-pixel electrodes. In this case, it may be understood that one pixel electrode is disposed in each of the first pixel region PXA1 and the second pixel region PXA2, and two pixel electrodes are disposed in the third pixel region PXA3.

The gradation of the light emitted from the high gradation region PXA3-H may be higher than the gradation of the light emitted from the low gradation region PXA3-L.

In FIG. 4, a part of the cross section of the first pixel PX1 is shown. Since the cross section of the second pixel PX2 and the third pixel PX3 is substantially the same as the cross section of the first pixel PX1, in the present specification, the lamination structure of the description display panel DP will be described with reference to the cross section of the first pixel PX1.

As shown in FIGS. 3A and 4, the first transistor TR1 includes a control electrode CTE connected to the i-th gate line GLi, an activation layer AL overlapping the control electrode CTE, an input electrode IE connected to the first data line DL1, and an output electrode OE disposed apart from the input electrode IE.

The first liquid crystal capacitor Clc1 may be formed by the first pixel electrode PE1 and the common electrode CE. The first storage capacitor Cst1 may be formed by the first pixel electrode PE1 and the storage line STL overlapping the first pixel electrode PE1.

The i-th gate line GLi and the storage line STL are disposed on one surface of the first substrate DS1. The control electrode CTE is branched from the i-th gate line GLi. The i-th gate line GLi and the storage line STL may include a metal (for example, Al, Ag, Cu, Mo, Cr, Ta, Ti, and so on) or an alloy thereof. The i-th gate line GLi and the storage line STL may have a multi layer structure, and for example, may include a Ti layer and a Cu layer.

A first insulating layer 10 covering the control electrode CTE and the storage line STL is disposed on one surface of the first substrate DS1. The first insulating layer 10 may include at least one of an inorganic material and an organic material. The first insulating layer 10 may be an organic layer or an inorganic layer. The first insulating layer 10 may have a multi layer structure and for example, may include a silicon nitride layer and a silicon oxide layer.

The activation layer AL overlapping the control electrode CTE is disposed on the first insulating layer 10. The activation layer AL may include a semiconductor layer (not shown) and an ohmic contact layer (not shown).

The activation layer AL may include amorphous silicon, polysilicon, or a metal oxide semiconductor.

An output electrode OE and an input electrode IE are disposed on the activation layer AL.

Although the first transistor TR1 having a staggered structure is shown in FIG. 4 as an example, a structure of the first transistor TR1 is not limited thereto. The first transistor TR1 may have a planar structure.

A second insulating layer 20 covering the activation layer AL, the output electrode OE, and the input electrode IE is disposed on the first insulating layer 10. The second insulating layer 20 provides a flat surface. The second insulating layer 20 may include an organic material.

The first pixel electrode PE1 is displayed on the second insulating layer 20. The first pixel electrode PE1 is connected to the output electrode OE through a second insulating layer 20 and a first contact hole CH1 penetrating the second insulating layer 20. The second contact hole CH2 shown in FIG. 3B and the third and fourth contact holes CH3 and CH4 shown in FIG. 3C may also function as the first contact hole CH1.

An alignment film 30 covering the first pixel electrode PE1 may be disposed on the second insulating layer 20.

A first color filter CF1 is disposed on one surface of the second substrate DS2. The first color filter CF1 is disposed overlapping the first pixel electrode PE1. A common voltage is applied to the common electrode CE. A common voltage and a pixel voltage have different values. An alignment film (not shown) covering the common electrode CE may be disposed on the common electrode CE. Another insulating layer may be disposed between the first color filter layer CF1 and the common electrode CE.

The first color filter CF1 may transmit light having a wavelength of 640 nm or more and 730 nm or less among the incident light. In an embodiment of the inventive concept, the first color filter CF1 may transmit only light of a specific wavelength band among the incident light, thereby generating light having a red color.

Although not shown in the drawing, the display panel DP may further include a second color filter (not shown) disposed in the second pixel region PXA2 and overlapping the second pixel electrode PE2. The second color filter may transmit light having a wavelength of 492 nm or more and 580 nm or less among the incident light. In an embodiment of the inventive concept, the second color filter may transmit only light of a specific wavelength band among the incident light, thereby generating light having a green color.

Although not shown in the drawing, the display panel DP may further include a third color filter (not shown) disposed in the third pixel region PXA3 and overlapping the third pixel electrode PE3. The third color filter may transmit light having a wavelength of 420 nm or more and 490 nm or less among the incident light. In an embodiment of the inventive concept, the third color filter may transmit only light of a specific wavelength band among the incident light, thereby generating light having a blue color.

On the other hand, a section of the pixel PX shown in FIG. 4 is just one example. In another example embodiment, at least one of the first color filter layer CF1 and the common electrode CE may be disposed on the first substrate DS1. That is, a liquid crystal display panel according to this embodiment of the inventive concept may include a pixel in a Vertical Alignment (VA) mode, a Patterned Vertical Alignment (PVA) mode, an in-plane switching (IPS) mode, a fringe-field switching (FFS) mode, or a Plane to Line Switching (PLS) mode.

In the case of having the layout structure of the third pixel region PXA3 shown in FIG. 3C, the visibility or the viewing angle characteristics are improved as compared with the layout structure of the first and second pixel regions PXA1 and PXA2 shown in FIGS. 3A and 3B. On the other hand, in the case of having the layout structure of the third pixel region PXA3 shown in FIG. 3C, more transistors are arranged than in the case of having the layout structure of the first and second pixel regions PXA1 and PXA2 shown in FIGS. 3A and 3B, and accordingly, the light transmittance of the third pixel region PXA3 becomes lower than the light transmittance of the first and second pixel regions PXA1 and PXA2.

That is, the ratio (hereinafter referred to as a first ratio) of the light emitted from the backlight unit 500 to the first pixel region PXA1 may be substantially the same as the ratio (hereinafter referred to as a second ratio) at which light emitted from the backlight unit 500 passes through the second pixel region PXA2. However, the ratio (hereinafter referred to as the third ratio) of the light emitted from the backlight unit 500 to the third pixel region PXA3 may be smaller than the first ratio or the second ratio.

Thus, the visibility and viewing angle characteristics and the light transmittance characteristics are in a trade off relationship with each other.

When assuming that red light, green light, and blue light having the same area are emitted, the ratio of the red light to the total luminance is about 15% and the ratio of the green light to the total luminance is about 80%, and the ratio of the blue light to the total luminance is about 5%. Therefore, when the amount of green light in red light, green light, and blue light is reduced, it greatly affects the overall luminance, but when the amount of blue light is reduced, it does not significantly affect the overall luminance.

Therefore, as shown in FIG. 2, a structure for improving the visibility and the viewing angle characteristic may be applied only to the third pixel PX3 from which blue light is emitted, and a structure for securing a high light transmittance may be applied to the first pixel PX1 and the second pixel PX2. By the combination of the first to third pixels PX1 to PX3, the viewing angle and visibility characteristics are improved and the display panel DP having high light transmittance may be provided.

Figure 5:
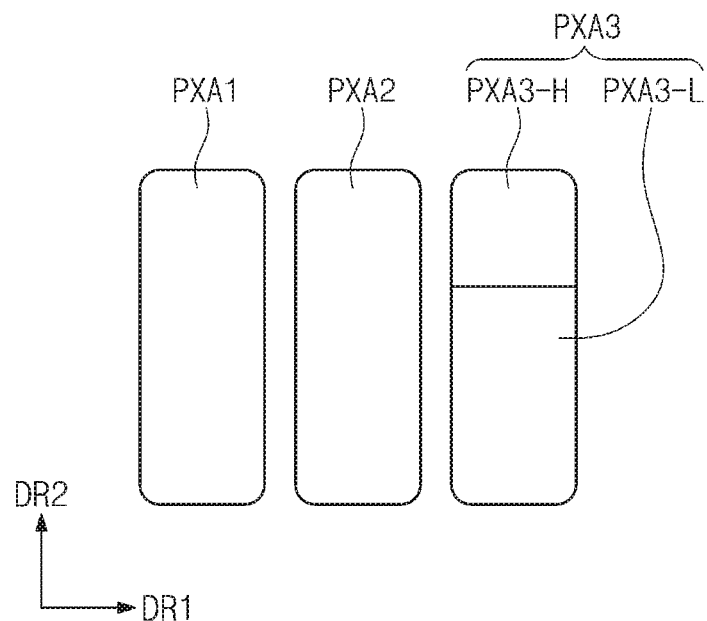
FIG. 5 shows an example in which a first pixel region, a second pixel region, and a third pixel region are disposed.
Figure 6:
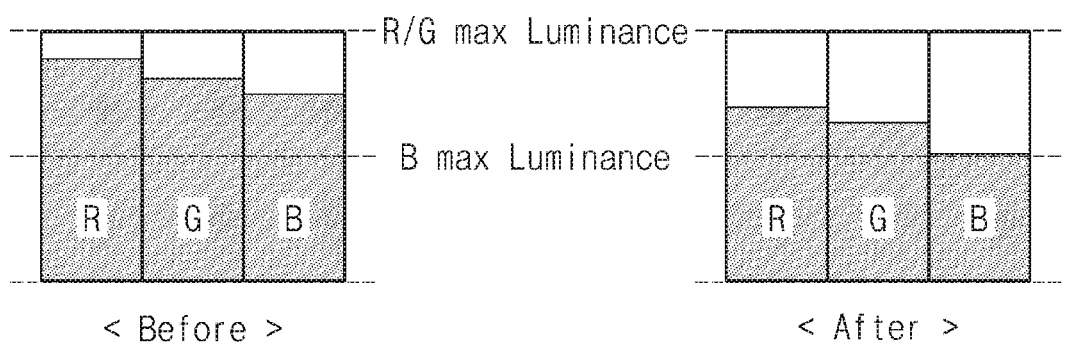
FIG. 6 exemplarily shows a luminance control method for driving a display panel including pixel regions as shown in FIG. 5.

FIG. 5 shows an example in which a first pixel region PXA1, a second pixel region PXA2, and a third pixel region PXA3 are disposed. FIG. 6 exemplarily shows a luminance control method for driving a display panel DP including pixel regions PXA1 to PXA3 as shown in FIG. 5.

Referring to 5, the horizontal length measured on the first direction DR1 of the first pixel region PXA1, the second pixel region PXA2, and the third pixel region PXA3 may be shorter than a particular vertical length on the second direction DR2.

The first pixel region PXA1, the second pixel region PXA2, and the third pixel region PXA3 may be sequentially arranged in the first direction DR1.

Referring to FIG. 6, since the third pixel region PXA3 emitting blue light has a lower light transmittance than the first pixel region PXA1 emitting red light and the second pixel region PXA2 emitting green light, the maximum luminance B max luminance that the blue light may have is lower than the maximum luminance RIG max luminance that the red light and the green light may have. Therefore, if the luminance of the light emitted from each of the first to third pixel regions PXA1 to PXA3 is not adjusted, red light, green light, and blue light are not combined at an originally expected ratio, resulting in a problem that desired colors are not emitted.

Therefore, when the luminance of the red light and the green light is reduced in correspondence to the maximum luminance B max luminance that the blue light may have, a desired color may be realized through a combination of these.

Figure 7:
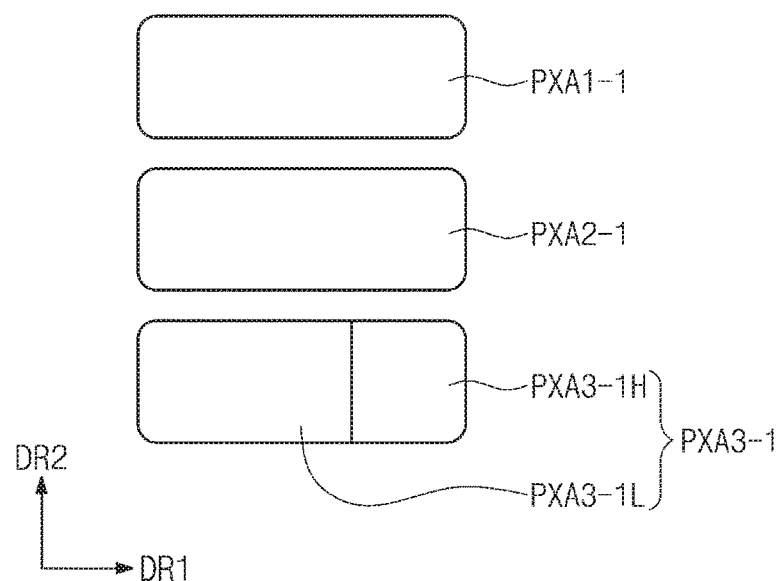
FIGS. 7 and 8 show examples in which a first pixel region, a second pixel region, and a third pixel region are disposed.

FIG. 7 shows an example in which a first pixel region PXA1-1, a second pixel region PXA2-1, and a third pixel region PXA3-1 are disposed. The third pixel region PXA3-1 includes a high gradation region PXA3-1H and a low gradation region PXA3-1L.

The horizontal length measured on the first direction DR1 of the first pixel region PXA1-1, the second pixel region PXA2-1, and the third pixel region PXA3-1 may be longer than a particular vertical length on the second direction DR2.

The first pixel region PXA1-1, the second pixel region PXA2-1, and the third pixel region PXA3-1 may be sequentially arranged in the second direction DR2.

In addition, the description of each of the first pixel region PXA1-1, the second pixel region PXA2-1, and the third pixel region PXA3-1 is substantially the same as the description of each of the first pixel region PXA1, the second pixel region PXA2, and the third pixel region PXA3 described above, such that its description will be omitted.

Figure 8:
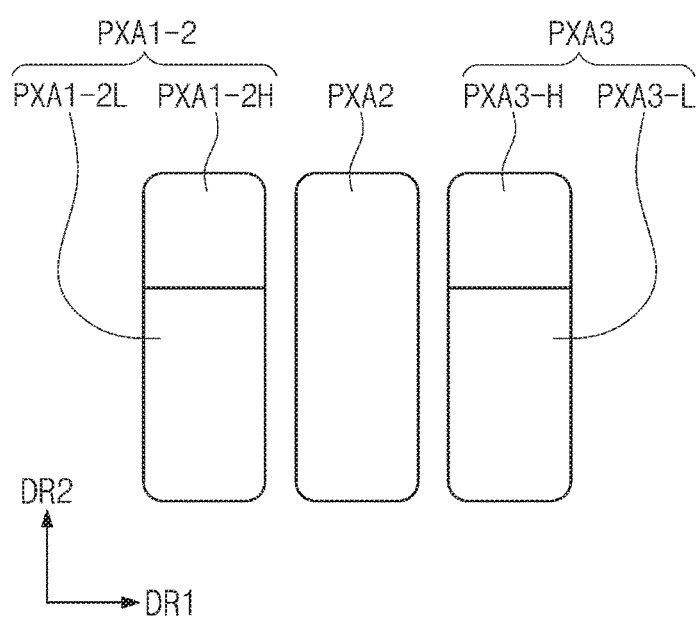

FIG. 8 shows an example in which a first pixel region PXA1-2, a second pixel region PXA2, and a third pixel region PXA3 are disposed. FIG. 8 is a view of the first pixel region PXA1-1 of FIG. 7 changed to the first pixel region PXA1-2.

The first pixel region PXA1-2 may include a high gradation region PXA1-2H and a low gradation region PXA-2L.

Although the first pixel region PXA1-2 is a region that emits light having a red color, it may have a structure for improving the visibility and viewing angle characteristics as shown in FIG. 3C. As described above, since the ratio of the red light to the total luminance is about 15% and it is smaller than the ratio of the green light to the total luminance, by the arrangement of the pixel regions PXA1-2, PXA2, and PXA3 shown in FIG. 8, it is possible to provide a display panel DP having good visibility and viewing angle characteristics and excellent light transmittance.

According to an embodiment of the inventive concept, a liquid crystal display panel having excellent visibility and viewing angle characteristics and a liquid crystal display device including the liquid crystal display panel may be provided.

Also, according to an embodiment of the inventive concept, it is possible to provide a liquid crystal display panel having excellent light transmittance at a high resolution and a liquid crystal display device including the liquid crystal display panel.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:

1. A liquid crystal display device comprising:
    a display panel including a liquid crystal layer; and
    a backlight unit configured to provide light to the display panel,
    wherein a first pixel region, a second pixel region, and a third pixel region are defined in the display panel,
    wherein a wavelength of a first color light generated by transmitting the light through the first pixel region and a wavelength of a second color light generated by transmitting the light through the second pixel region are longer than a wavelength of a third color light generated by transmitting the light through the third pixel region,
    wherein a first ratio at which the light is emitted from the backlight unit through the first pixel region and a second ratio at which the light is emitted from the backlight unit through the second pixel region are greater than a third ratio at which the light is emitted from the backlight unit through the third pixel region, and
    wherein the third pixel region includes a high gradation region having a first sub-pixel electrode and a low gradation region having a second sub-pixel electrode, and an area of the low gradation region is greater than an area of the high gradation.

2. The liquid crystal display device of claim 1, wherein the first color light has a red color, the second color light has a green color, and the third color light has a blue color.

3. The liquid crystal display device of claim 2, wherein a gradation of light emitted from the high gradation region of the third color light is higher than a gradation of light emitted from the low gradation region of the third color light.

4. The liquid crystal display device of claim 1, wherein the display panel comprises a plurality of transistors,
    wherein the number of transistors disposed in the first pixel region among the plurality of transistors is equal to the number of transistors disposed in the second pixel region among the plurality of transistors, and
    wherein the number of transistors disposed in the third pixel region among the plurality of transistors is greater than the number of transistors disposed in the first pixel region among the plurality of transistors.

5. The liquid crystal display device of claim 4, wherein the number of the transistors disposed in the first pixel region is one, and the number of the transistors disposed in the third pixel region is three.

6. The liquid crystal display device of claim 1, wherein the display panel further comprises:
    a first color filter overlapping the first pixel region and configured to transmit light having a wavelength of between 640 nm and 730 nm in the light;
    a second color filter overlapping the second pixel region and configured to transmit light having a wavelength of between 492 nm and 580 nm in the light; and
    a third color filter overlapping the third pixel region and configured to transmit light having a wavelength of between 420 nm and 490 nm in the light.

7. The liquid crystal display device of claim 1, wherein the display panel further comprises:
    a plurality of pixel electrodes; and
    a common electrode overlapping the plurality of pixel electrodes,
    wherein the liquid crystal layer is disposed between the plurality of pixel electrodes and the common electrode.

8. The liquid crystal display device of claim 7, wherein the number of pixel electrodes disposed in the first pixel region among the plurality of pixel electrodes is equal to the number of pixel electrodes disposed in the second pixel region among the plurality of pixel electrodes,
    wherein the number of pixel electrodes disposed in the third pixel region among the plurality of pixel electrodes is greater than the number of pixel electrodes disposed in the first pixel region.

9. The liquid crystal display device of claim 8, wherein the number of the pixel electrodes disposed in the first pixel region is one and the number of the pixel electrodes disposed in the third pixel region is two.

10. A liquid crystal display panel comprising:
    a first substrate where a first pixel region, a second pixel region, and a third pixel region are defined;
    a second substrate facing the first substrate;
    a backlight unit disposed on the first substrate; and
    a liquid crystal layer disposed between the first substrate and the second substrate,
    wherein a first color light emitted from the first pixel region has a red color, a second color light emitted from the second pixel region has a green color, and a third color light emitted from the third pixel region has a blue color, wherein a light emitted from the backlight unit through the third pixel region is less than a light emitted from the backlight unit through the first pixel region and a light emitted from the backlight unit through the second pixel region, and wherein the third pixel region includes a high gradation region having a first sub-pixel electrode and a low gradation region having a second sub-pixel electrode, and an area of the low gradation region is greater than an area of the high gradation.

11. The liquid crystal display panel of claim 10, wherein a gradation of light emitted from the high gradation region in the third color light is higher than a gradation of light emitted from the low gradation region in the third color light.

12. The liquid crystal display panel of claim 11, further comprising a plurality of transistors disposed on the first substrate, wherein the number of transistors disposed in the first pixel region among the plurality of transistors is equal to the number of transistors disposed in the second pixel region among the plurality of transistors, and wherein the number of transistors disposed in the third pixel region among the plurality of transistors is greater than the number of transistors disposed in the first pixel region among the plurality of transistors.

13. The liquid crystal display panel of claim 12, wherein the number of the transistors disposed in the first pixel region is one, and the number of the transistors disposed in the third pixel region is three.

14. The liquid crystal display panel of claim 12, further comprising a plurality of pixel electrodes, each of which is electrically connected to the plurality of transistors; and a common electrode overlapping the plurality of pixel electrodes, wherein the liquid crystal layer is disposed between the plurality of pixel electrodes and the common electrode.

15. The liquid crystal display panel of claim 14, wherein the number of pixel electrodes disposed in the first pixel region among the plurality of pixel electrodes is equal to the number of pixel electrodes disposed in the second pixel region among the plurality of pixel electrodes, and wherein the number of pixel electrodes disposed in the third pixel region among the plurality of pixel electrodes is greater than the number of pixel electrodes disposed in the first pixel region.

16. The liquid crystal display panel of claim 15, wherein the number of the pixel electrodes disposed in the first pixel region is one and the number of the pixel electrodes disposed in the third pixel region is two.

17. A liquid crystal display device comprising:

a display panel including a liquid crystal layer, wherein a first pixel region, a second pixel region, and a third pixel region are defined in the display panel; and a backlight unit configured to provide light to the display panel, wherein each of the first pixel region and the second pixel region comprises only one transistor, and the third pixel region comprises three transistors, wherein a wavelength of a first color light generated by transmitting the light through the first pixel region and a wavelength of a second color light generated by transmitting the light through the second pixel region are longer than a wavelength of a third color light generated by transmitting the light through the third pixel region, wherein a first ratio at which the light is emitted from the backlight unit through the first pixel region and a second ratio at which the light is emitted from the backlight unit through the second pixel region are greater than a third ratio at which the light is emitted from the backlight unit through the third pixel region, and wherein the third pixel region includes a high gradation region having a first sub-pixel electrode and a low gradation region having a second sub-pixel electrode, and an area of the low gradation region is greater than an area of the high gradation.

18. The liquid crystal display device of claim 17, wherein the first color light has a red color, the second color light has a green color, and the third color light has a blue color.

19. The liquid crystal display device of claim 18, wherein a gradation of light emitted from the high gradation region of the third color light is higher than a gradation of light emitted from the low gradation region of the third color light.

* * * * *